US012793462B2

(12) United States Patent
Hu et al.

(10) Patent No.: US 12,793,462 B2
(45) Date of Patent: Nov. 10, 2026

(54) OBJECT TRACKING METHOD, AND TERMINAL DEVICE AND COMPUTER-READABLE STORAGE MEDIUM USING THE SAME

(71) Applicant: UBTECH ROBOTICS CORP LTD, Shenzhen (CN)

(72) Inventors: Shuping Hu, Shenzhen (CN); Kan Wang, Shenzhen (CN); Pei Dong, Shenzhen (CN); Jianxin Pang, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 228 days.

(21) Appl. No.: 18/964,336

(22) Filed: Nov. 29, 2024

(65) Prior Publication Data

US 2025/0218210 A1 Jul. 3, 2025

(30) Foreign Application Priority Data

Dec. 27, 2023 (CN) ......................... 202311831083.4

(51) Int. Cl.
*G06V 40/10* (2022.01)
*G06V 10/25* (2022.01)
(Continued)

(52) U.S. Cl.
CPC .............. *G06V 40/10* (2022.01); *G06V 10/25* (2022.01); *G06V 10/761* (2022.01); *G06V 10/7715* (2022.01); *G06V 10/82* (2022.01); *G06V 40/165* (2022.01); *G06V 40/167* (2022.01); *G06V 40/171* (2022.01); *G06V 40/18* (2022.01)

(58) Field of Classification Search
CPC ...... G06V 10/25; G06V 10/74; G06V 10/759; G06V 10/761; G06V 10/7715; G06V 10/82; G06V 40/10; G06V 40/16; G06V 40/161; G06V 40/165; G06V 40/167;
(Continued)

(56) References Cited

U.S. PATENT DOCUMENTS

2022/0207266 A1 * 6/2022 Wang ..................... G06V 40/10

FOREIGN PATENT DOCUMENTS

CN 110472611 A * 11/2019 ......... G06F 18/2415
CN 111898592 B * 12/2020 ........... G06F 18/214
(Continued)

*Primary Examiner* — Scott A Rogers

(57) ABSTRACT

An object tracking method, and a terminal device and a computer-readable storage medium using the same are provided. The method includes: obtaining first feature information of a target human body in a first image and a first detection frame of a head area of the target human body; obtaining second feature information of each human object in a second image and a second detection frame of a head area of the human object by performing a first image detection on the second image; and recognizing the target human body from the human object in the second image according to a first similarity between the first feature information and the second feature information and a second similarity between the first detection frame and the second detection frame. The above-mentioned method can effectively improve the accuracy of object matching, thereby enhancing the reliability of the results of multi-object tracking.

20 Claims, 7 Drawing Sheets

(51) Int. Cl.

| | |
|---|---|
| ***G06V 10/74*** | (2022.01) |
| ***G06V 10/77*** | (2022.01) |
| ***G06V 10/82*** | (2022.01) |
| ***G06V 40/16*** | (2022.01) |
| ***G06V 40/18*** | (2022.01) |

(58) Field of Classification Search
CPC .... G06V 40/168; G06V 40/171; G06V 40/18; G06V 40/193; G06V 40/197
See application file for complete search history.

(56) References Cited

FOREIGN PATENT DOCUMENTS

| | | | | | |
|---|---|---|---|---|---|
| CN | 115359419 | A | * | 11/2022 | ............. G06V 20/41 |
| CN | 111339855 | B | * | 5/2023 | ............... G06T 7/20 |
| CN | 113469132 | B | * | 9/2024 | ........... G06F 18/214 |
| CN | 114627526 | B | * | 2/2025 | ........... G06F 18/214 |
| CN | 122090350 | A | * | 5/2026 | ............. G06V 20/40 |
| WO | WO-2024111730 | A1 | * | 5/2024 | ............... G06N 3/08 |

* cited by examiner (a) (b)

OBJECT TRACKING METHOD, AND TERMINAL DEVICE AND COMPUTER-READABLE STORAGE MEDIUM USING THE SAME

CROSS REFERENCE TO RELATED APPLICATIONS

The present disclosure claims priority to Chinese Patent Application No. 202311831083.4, filed Dec. 27, 2023, which is hereby incorporated by reference herein as if set forth in its entirety.

TECHNICAL FIELD

The present disclosure relates to image processing technology, and particularly to an object tracking method, and a terminal device and a computer-readable storage medium using the same.

BACKGROUND

Object tracking refers to tracking an object of interest in a sequence of image frames. In the process of object tracking, not only image detection technology but also image matching technology is involved. Specifically, all objects are detected from the images first, and then a target object is matched from all the detected objects.

When performing multi-object tracking, object overlapping often occurs. For example, if there are multiple human objects close to each other, or multiple human objects with similar appearances, feature information is easily confused and one human object may be mistaken as another human object, resulting in the object overlapping. Therefore, how to improve the object matching accuracy is the key to improving the reliability of multi-object tracking results.

BRIEF DESCRIPTION OF DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
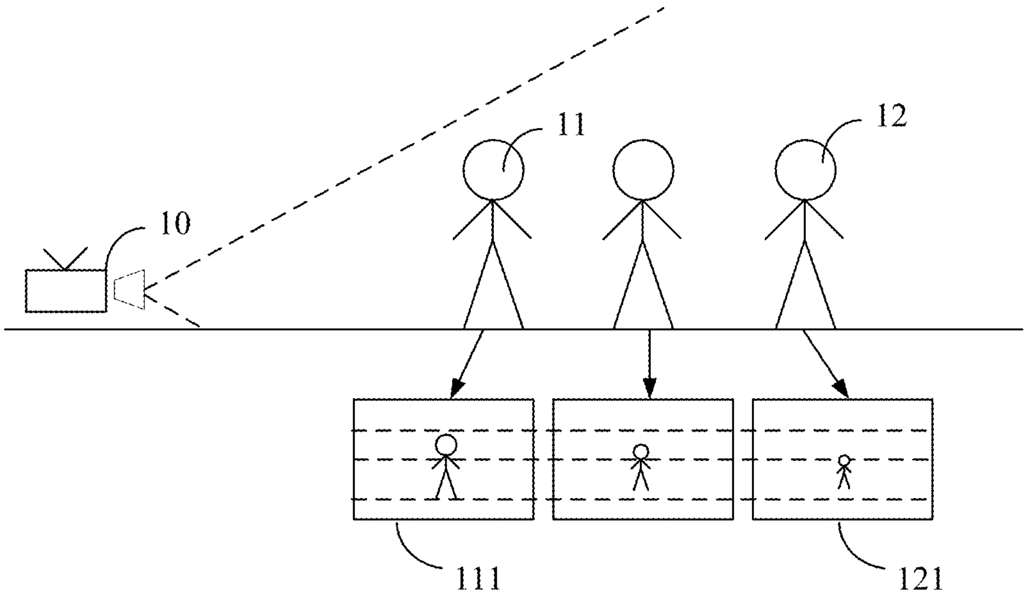
FIG. 1 is a schematic diagram of imaging at different distances according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the specification and the claims of the present disclosure, the terms "first", "second", "third", and the like in the descriptions are only used for distinguishing, and cannot be understood as indicating or implying relative importance.

References such as "one embodiment" and "some embodiments" in the specification of the present disclosure mean that the particular features, structures or characteristics described in combination with the embodiment(s) are included in one or more embodiments of the present disclosure. Therefore, the sentences "in one embodiment," "in some embodiments," "in other embodiments," "in still other embodiments," and the like in different places of this specification are not necessarily all refer to the same embodiment, but mean "one or more but not all embodiments" unless specifically emphasized otherwise.

Object tracking refers to tracking an object of interest in a sequence of image frames. In the process of object tracking, not only image detection technology but also image matching technology is involved. Specifically, all objects are detected from the images first, and then a target object is matched from all the detected objects.

When performing multi-object tracking, object overlapping often occurs. For example, if there are multiple human objects close to each other, or multiple human objects with similar appearances, feature information is easily confused and one human object may be mistaken as another human object, resulting in the object overlapping. Therefore, how to improve the object matching accuracy is the key to improving the reliability of multi-object tracking results.

In order to solve the forgoing problems, researches have been conducted and found that in most scenarios the installation angle and height of a camera are fixed and the tracked human bodies are mostly pedestrians, that is, general people with similar height and head size. Based on this premise, since the head of human can generally reflect the height of a human body, the pixel positions and size of a head area in a two-dimensional image may be used to effectively represent the distance of the human body relative to the camera capturing the human body.

FIG. 1 is a schematic diagram of imaging at different distances according to an embodiment of the present disclosure. As shown in FIG. 1, as an example, among the human bodies shot by a camera 10, there is a human body 11 that is closest to the camera 10, and a human body 12 that is farthest from the camera 10. Correspondingly, among the three images captured through the camera 10, a head area of human in a captured image 111 corresponding to the human body 11 is the largest and positioned highest, while a head area of human in a captured image 121 corresponding to the human body 12 is the smallest and positioned lowest.

Although the larger the distance of the human body to the camera 10 increases, the smaller the detection frame for the human body and the lower the position, due to the changeable posture of the human body, the completeness of the detection frame for the human body does not have a proportional relationship with the distance between the human body and the camera 10, while the size of the head area of the human body is almost unaffected by the posture of the human body, it will be a better choice to use the head area of the human body for object tracking.

Based on this, the embodiments of the present disclosure provide an object tracking method. In this embodiment, when performing object matching, feature information of the human body as a whole and the detection frame of the head area are comprehensively considered. In the case that the distance between the human bodies of similar appearance is close, since the size of the head area is less affected by the change of the posture of the human bodies, different human objects can be distinguished in a more accurate manner by using the detection frame of the head area, and the accuracy of object matching can be effectively improved by combining with the feature information of the human body as a whole, thereby improving the reliability of the results of multi-object tracking.

Figure 2:
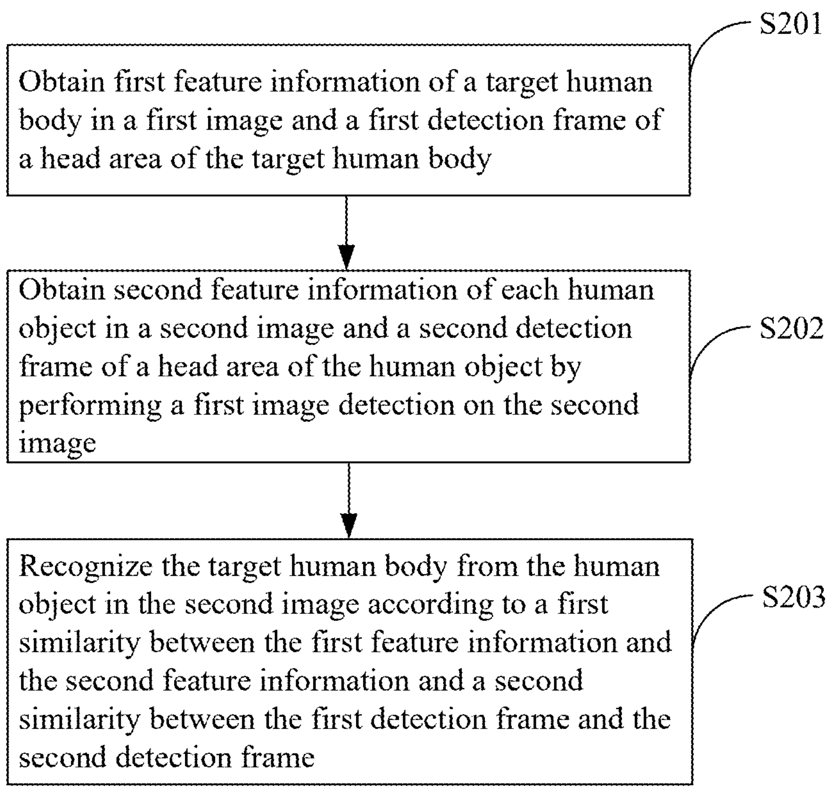
FIG. 2 is a flow chart of an object tracking method according to an embodiment of the present disclosure.

FIG. 2 is a flow chart of an object tracking method according to an embodiment of the present disclosure. In this embodiment, a method for tracking objects may be applied on (a processor of) an apparatus for tracking objects shown in FIG. 6. In other embodiments, the method may be implemented through a terminal device shown in FIG. 7. As shown in FIG. 2, as an example, in this embodiment, the object tracking method may include the following steps.

S201: obtaining first feature information of a target human body in a first image and a first detection frame of a head area of the target human body.

S202: obtaining second feature information of each human object in a second image and a second detection frame of a head area of the human object by performing a first image detection on the second image.

In which, the first image and the second image are a sequence of image frames captured through a camera (of, for example, the apparatus for tracking objects of FIG. 6 or the terminal device of FIG. 7), where the second image is an image frame with the sequence just after the first image.

In the method, since the first image is the frame collected first and the second image is that collected later, the first image detection has been performed on the first image while processing the second image. In order to improve the processing efficiency, the result of object tracking of the first image, that is, the first feature information of the target human body in the first image and the first detection frame of the head area of the target human body may be stored, so that the tracking result corresponding to the stored first image may be obtained while processing the second image. In this manner, when processing the next image frame, there is no need to repeat the image detection of the previous image frame, which is conducive to improving the processing efficiency.

It should be noted that the method for performing the first image detection on each image frame may be the same. For example, the method for performing the first image detection on the first image may be the same as that for performing the first image detection on the second image in step S202. In order to simplify the description, the second image is taken as an example to introduce the first image detection method. As for the process of performing the first image detection on the first image and obtaining the first feature information and the first detection frame of the head area, please refer to the following description that performs the first image detection method on the second image, which will not be descripted herein.

As an example, step S202 may include: obtaining the human body detection frame and the corresponding second feature information of each human object in the second image by inputting the second image into a human body detection model; and obtaining the second detection frame of the head area in the second image by inputting the first image into a detection model for the head area.

In the forgoing manner, it is equivalent to separating the detection task of the human body and that of the head area. However, since the two tasks are performed separately, the detection task of the human body and that of the head area cannot share the feature information of the images (i.e., the first feature information and the second feature information), the two models need to perform feature extraction on the second image respectively, which will increase the complexity of the models and the amount of data processing.

As another example, step S202 may include the following steps:

I. obtaining the second feature information and a first key point of each human object in the second image by performing a second image detection on the second image.

II. obtaining, according to the first key point, the second detection frame of the head area of the human object.

In this embodiment, the second image detection may be a human body detection. Performing the second image detection on the second image is equivalent to performing a human body detection task.

In steps I-II, it is equivalent to detecting the head area using the result (i.e., the first key point) of the human body detection task. In this manner, it is equivalent to merging the human body detection task and the head area detection task together for execution, which can effectively reduce the complexity of the models and the amount of data processing, and is conducive to improving the processing efficiency.

In some implementations, step I may include:

obtaining a trained multi-task model; and obtaining the second feature information and the first key point of each human object in the second image by performing the second image detection on the second image using the multi-task model.

In this embodiment, the multi-task model is for extracting the feature information of the human image (e.g., the human object) in the to-be-processed image (e.g., the second image) and detecting the key points of the human body in the to-be-processed image. Through the multi-task model, it is equivalent to merging the human body detection task and the head area detection task together for execution, which can effectively reduce the complexity of the models and the amount of data processing, and is conducive to improving the processing efficiency.

In which, the multi-task model may be a neural network, or other model with the functions of image detection algorithm, which will not be specifically limited herein.

Figure 3:
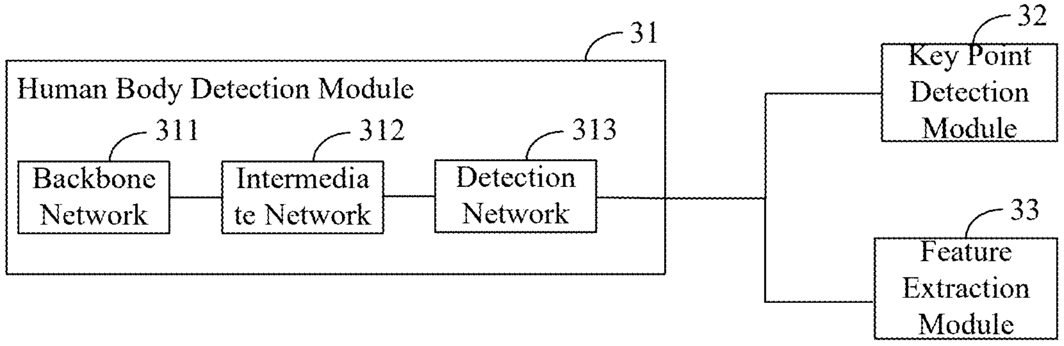
FIG. 3 is a schematic diagram of a multi-task model according to an embodiment of the present disclosure.

FIG. 3 is a schematic diagram of a multi-task model according to an embodiment of the present disclosure. As shown in FIG. 3, in this embodiment, as an example, the multi-task model may include a human body detection module 31, a key point detection module 32, and a feature extraction module 33. In which, the human body detection module 31 is configured to perform the human body detection on an input image to output the human body detection frame for each human object. The key point detection module 32 is configured to detect the key points of the human body that correspond to each human body detection frame according to the human body detection frame output by the human body detection module 31. The feature extraction module 33 is configured to extract appearance features of the human body using each human body detection frame output by the human body detection module 31 to output the second feature information corresponding to the human body detection frame.

In some embodiments, the human body detection module 31 may include a backbone network 311, an intermediate network 312, and a detection network 313. In which, the backbone network 311 is configured to extract features from the input image; the intermediate network 312 is configured to aggregate and refine the features extracted by the backbone network 311, for example, enhancing the feature expression capability and receptive field of the model; the detection network 313 is configured to perform the human body detection based on the extracted features to output the human body detection frame.

Based on the multi-task model in FIG. 3, the process of performing the second image detection on the second image may include:

- obtaining a human body detection frame of each human object by detecting the human object in the second image using the human body detection module;
- obtaining the first key point of the human object by detecting the human key points within the human body detection frame using the key point detection module; and
- obtaining the second feature information of the human object by extracting image feature information in the human body detection frame using the feature extraction module.

In which, the process of detecting the human object in the second image using the human body detection module may include: inputting the second image into the above-mentioned multi-task model; first extracting, through the backbone network 311, the features from the second image; aggregating and refining, through the intermediate network 312, the features extracted by the backbone network 311 to obtain the processed feature information so as to input the processed feature information into the detection network 313; and detecting, through the detection network 313, the human object in the second image according to the processed feature information to obtain the human body detection frame for each human object.

As can be seen from the forgoing example, the key point detection module 32 and the feature extraction module 33 both perform processing based on the output result of the human body detection module 31, which is equivalent to the above-mentioned human body detection task, a key point detection task and a human appearance feature extraction task sharing a set of feature information (i.e., the feature information output by the intermediate network 312), realizing feature sharing. In this manner, the backbone network 311 and the intermediate network 312 only need to perform a feature extraction process once in advance, which is conducive to improving processing efficiency.

In this embodiment, before applying the multi-task model, the multi-task model is first trained to obtain the trained multi-task model. By using the trained multi-task model to perform the second image detection, which can not only improve the detection accuracy, but also improve the detection efficiency.

In some embodiments, the process of training the multi-task model may include:

- obtaining a plurality of sample images, where each sample image carries real identification information of the human object, and the real identification information may include a number, real key points, and real appearance features; and obtaining the trained multi-task model by training the multi-task model according to the sample images until a detection accuracy of the multi-task model reaches a predetermined accuracy.

In an example of model training, it may input a sample image into the multi-task model so that the multi-task model outputs predicted feature information and predicted key points of each human object in the sample image; calculate a first loss value between the predicted key points and the real key points corresponding to the sample image, and calculate a second loss value between the predicted feature information and the real appearance features corresponding to the sample image; calculate a total loss based on the first loss value and the second loss value; if the total loss is larger than or equal to a predetermined threshold, updates model parameters of the multi-task model according to the total loss; and continuously trains the updated multi-task model based on the sample image until the total loss is less than the predetermined threshold so as to obtain the trained multi-task model.

It should be noted that the forgoing is only an example of model training. In a practical application, other training methods like controlling the number of iterations may be used, which will not be specifically limited herein. In addition, any model that can implement multiple tasks may be applied, and the specific structure of the multi-task model will not be specifically limited herein.

As an example, the first key point may include facial key points. Accordingly, step II may include: determining vertex positions of the head area according to the facial key points; and determining the second detection frame of the head area according to the vertex positions of the head area.

In this manner, it is equivalent to taking the facial area as the head area. However, in the application scenario of multiple human objects, the human face is often blocked. However, if merely the facial area is taken as the head area, the second detection frame obtained may be very small or even cannot be detected, which will affect the subsequent object tracking.

As another example, the first key points may include eye key points and shoulder key points. Accordingly, step II may include:

- determining, according to the eye key points and the shoulder key points, vertex positions of the head area; and determining, according to the vertex positions of the head area, the second detection frame of the head area.

In this manner, it is equivalent to comprehensively considering the facial area and the shoulder area when determining the head area, which increases the range of the head area. In the application scenario of multiple human objects, since the probability of the facial area and the shoulder area being blocked at the same time is small, it can effectively increase the probability of the head area being detected, while ensuring the reliability of the detection of the head area.

As an example, the first key points of the n-th human object may be as an equation of:

$$k_n = \{\lfloor u_{Leye}, v_{Leye} \rfloor, \lfloor u_{Reye}, v_{Reye} \rfloor, [u_{Lshoulder}, v_{Lshoulder}], [u_{Rshoulder}, v_{Rshoulder}]\};$$

where, $(u_{Leye}, v_{Leye})$ represents pixel coordinates of the left eye of the human body, $(u_{Reye}, v_{Reye})$ represents pixel coordinates of the right eye of the human body of the human body, $(u_{Lshoulder}, v_{Lshoulder})$ represents pixel coordinates of the left shoulder of the human body, and $(u_{Rshoulder}, v_{Rshoulder})$ represents the coordinates of the right shoulder of the human body. The vertices of the second detection frame $h_n$ of the corresponding head area may be obtained by calculating using $k_n$ through an equation of:

$$\begin{cases} x_1 = \min(u_{Lshoulder}, u_{Rshoulder}) \\ x_2 = \max(u_{Lshoulder}, u_{Rshoulder}) \\ y_1 = \min(v_{Leye}, v_{Reye}) \\ y_2 = \max(v_{Lshoulder}, v_{Rshoulder}) \end{cases};$$

where, $(x_1, y_1)$ represents pixel coordinates of the upper left corner of the second detection frame $h_n$, and $(x_2, y_2)$ represents pixel coordinates of the lower right corner of the second detection frame $h_n$.

It should be noted that the forgoing is only an example of calculating the vertices of the second detection frame. Since a pair of opposite corners can determine a rectangular frame, the vertex at the upper left corner and that at the lower right corner may be used to determine the second detection frame. Otherwise, in other examples, the vertex at the lower left corner and that at the upper right corner may also be used to determine the second detection frame, or four vertices may be used to determine the second detection frame, which will not be specifically limited herein.

S203: recognizing the target human body from the human object in the second image according to a first similarity between the first feature information and the second feature information and a second similarity between the first detection frame and the second detection frame.

In some embodiments, the target human body may be recognized from the human object of the second image only according to the first similarity, or it may be recognized from the human object of the second image only according to the second similarity.

Since the first similarity is for representing the similarity between the appearance features of the human body in two consecutive image frames, and the second similarity is for representing the similarity between the detection frames of the human body in the two consecutive image frames, if the object tracking is performed only according to the first similarity, the object tracking cannot be performed accurately in the case that there are multiple human bodies having similar appearances (e.g., wearing the same clothes); otherwise, if the object tracking is performed only according to the second similarity, the object tracking cannot be performed accurately in the case that the intersection between the human bodies is serious.

In some embodiments, step S203 may include:

1) calculating the first similarity between the first feature information and the second feature information.

As an example, the cosine similarity, Mahalanobis distance or Euclidean distance between the first feature information and the second feature information may be calculated to use as the first similarity.

2) calculating the second similarity between the first detection frame and the second detection frame.

As an example, an intersection-over-union ratio between the first detection frame and the second detection frame may be calculated to use as the second similarity. In which, the intersection-over-union ratio refers to the ratio of the intersection of two images to the union of the two images.

3) calculating, according to the first similarity and the second similarity, a third similarity between each human object and the target human body in the second image.

As an example, the first similarity and the second similarity may be added to obtain the third similarity.

As an example, a weighted sum of the first similarity and the second similarity may be calculated to obtain the third similarity. In which, the weight of the first similarity and that of the second similarity may be set according to actual needs or obtained through training.

4) recognizing, according to the third similarity, the target human body from the human object in the second image.

As an example, the human object corresponding to the maximum among the third similarities of different human objects may be recognized as the target human body.

Figure 4:
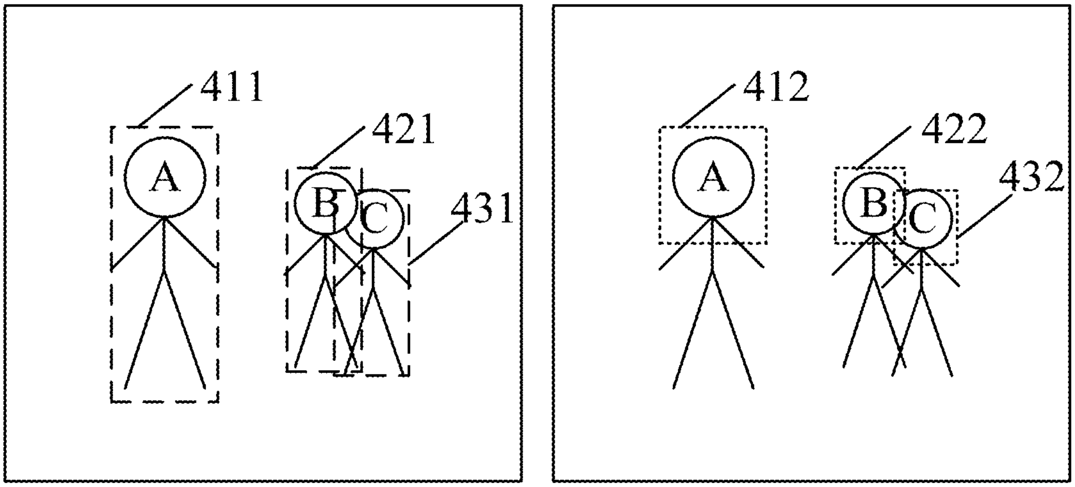
FIG. 4 is a schematic diagram of detection frames for overlapped human bodies according to an embodiment of the present disclosure.

FIG. 4 is a schematic diagram of detection frames for overlapped human bodies according to an embodiment of the present disclosure. As shown in part (a) of FIG. 4, from the human body detection frames, it can be seen that due to the serious overlap of the positions of human body B and human body C, the overlap area between human body detection frame 421 for human body B and human body detection frame 431 for human body C is large, which may lead to a high similarity between the calculated human body detection frames, thereby causing a false detection. As shown in part (b) of FIG. 4, from the detection frame of the head area of human body, it can be seen that although the positions of human body B and human body Care seriously overlapped, the overlap area between the detection frame 422 for the head area of human body B and the detection frame 432 for the head area of human body C is small. Correspondingly, the similarity between the calculated detection frames of the two head areas is low, which is conducive to ensuring the reliability of object tracking.

In this embodiment, it is equivalent to comprehensively considering the similarity of the appearances of the human bodies and that of the human body detection frames that are between two consecutive image frames. In the cases that there are multiple human bodies having similar appearances and/or overlapping in position, the object tracking can be performed accurately.

Figure 5:
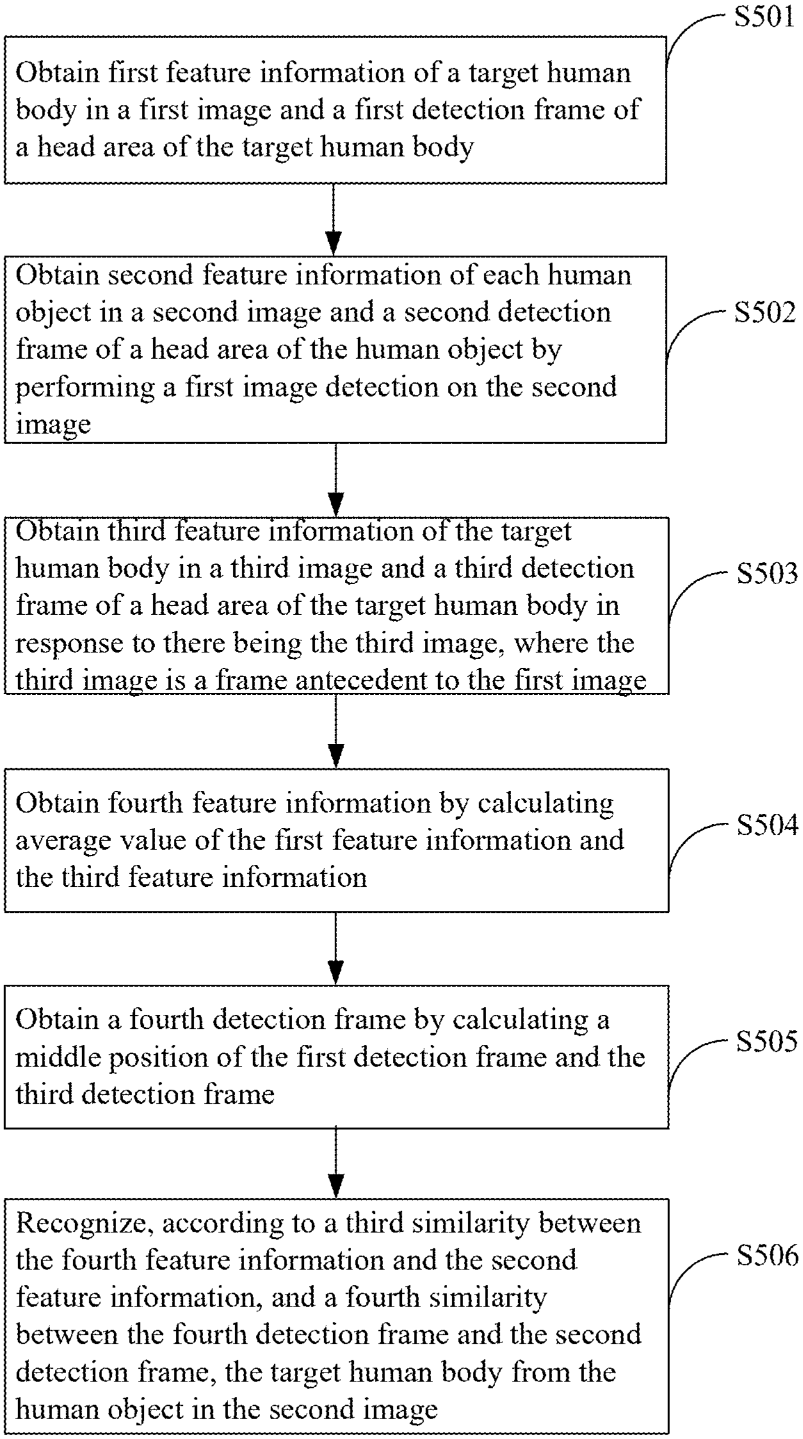
FIG. 5 is a flow chart of an object tracking method according to another embodiment of the present disclosure.

FIG. 5 is a flow chart of an object tracking method according to another embodiment of the present disclosure. In this embodiment, another method for tracking objects may be applied on (a processor of) the apparatus for tracking objects n FIG. 6. In other embodiments, the method may be implemented through the terminal device in FIG. 7. As shown in FIG. 5, in some embodiments, as an example, the object tracking method may include the following steps.

S501: obtaining first feature information of a target human body in a first image and a first detection frame of a head area of the target human body.

S502: obtaining second feature information of each human object in a second image and a second detection frame of a head area of the human object by performing a first image detection on the second image.

Steps S501-S502 are the same as the above-mentioned steps S201-S202. For details, please refer to the descriptions for steps S201-S202, which will not be descripted herein.

S503: obtaining third feature information of the target human body in a third image and a third detection frame of a head area of the target human body in response to there being the third image, where the third image is a frame antecedent to the first image.

The method of obtaining the third feature information of the target human body in the third image and the third detection frame of the head area of the target human body is the same as that of obtaining the first feature information of the target human body in the first image and the first detection frame of the head area of the target human body. For details, please refer to the descriptions for step S201, which will not be descripted herein.

S504: obtaining fourth feature information by calculating average value of the first feature information and the third feature information.

In this embodiment, the feature information may be a vector. Accordingly, as an example, the average value may be calculated by: calculating an average value between a first element in the first feature information and a second element in the second feature information; and determining fourth feature information based on the average value. In which, the first element corresponds to the second element. For example, if the first element is the first element in the first feature information, the second element is the first element in the second feature information; otherwise, if the first element is the last element in the first feature information, the second element is the last element in the second feature information.

It can be understood that since the image detection method of each image frame is the same, the length of the feature information of the human object in each image frame is also the same.

S505: obtaining a fourth detection frame by calculating a middle position of the first detection frame and the third detection frame.

As an example, a coordinate average value between the coordinate of the first vertex in the first detection frame and the coordinates of the second vertex in the third detection frame may be calculated to determine the fourth detection frame according to the coordinate average value. In which, the second vertex matches the first vertex. For example, if the first vertex is the vertex at the upper left corner of the first detection frame, the second vertex is the vertex at the upper left corner of the third detection frame; otherwise, if the first vertex is the vertex at the lower right corner of the first detection frame, the second vertex is the vertex at the lower right corner of the third detection frame.

S506: recognizing, according to a third similarity between the fourth feature information and the second feature information, and a fourth similarity between the fourth detection frame and the second detection frame, the target human body from the human object in the second image.

It should be noted that in this embodiment, it only shows the case where there are two frames of previously collected images before the second image. In a practical application, if there are multiple frames of previously collected images before the second image, the method may be executed by repeating steps S504-S506, which will not be described herein since the principle is the same.

In this embodiment, the tracking results of the image frames previously collected are comprehensively considered to perform the object tracking on the current image frame. In this manner, it can effectively reduce the influence of the error of the tracking result of a previous frame image on the subsequent object tracking results, which is conducive to improving the reliability of object tracking.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 6:
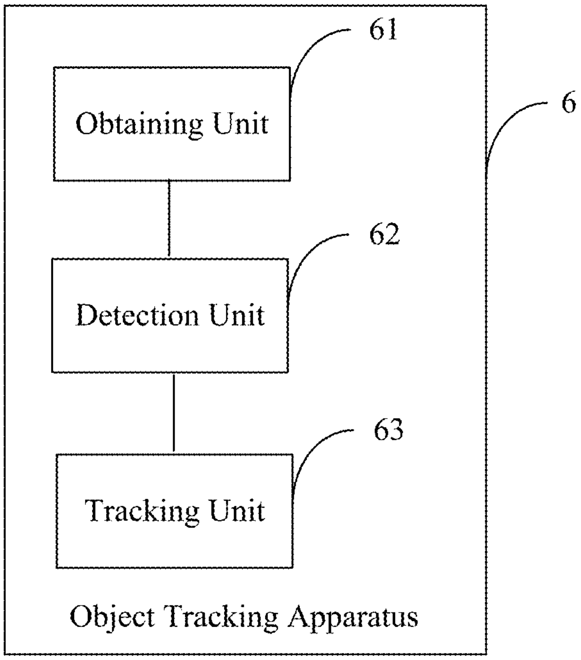
FIG. 6 is a schematic diagram of the structure of an object tracking apparatus according to an embodiment of the present disclosure.

FIG. 6 is a schematic diagram of the structure of an object tracking apparatus 6 according to an embodiment of the present disclosure. In this embodiment, the object tracking apparatus 6 (e.g., a vehicle or a robot) corresponding to the object tracking method described in the above-mentioned embodiment is provided. For the convenience of explanation, only the part related to this embodiment is shown.

As shown in FIG. 6, the apparatus 6 may include:

an obtaining unit 61 configured to obtain first feature information of the target human body in a first image and a first detection frame of a head area of the target human body;

a detection unit 62 configured to obtain second feature information of each human object in a second image and a second detection frame of a head area of the human object by performing a first image detection on the second image, where the second image is a frame subsequent to the first image; and a tracking unit 63 configured to recognize the target human body from the human object in the second image according to a first similarity between the first feature information and the second feature information and a second similarity between the first detection frame and the second detection frame.

As an example, the detection unit 62 may further configured to:

obtain the second feature information and a first key point of each human object in the second image by performing a second image detection on the second image; and obtain, according to the first key point, the second detection frame of the head area of the human object.

As an example, the detection unit 62 may further configured to:

obtain a trained multi-task model, where the multi-task model is for extracting feature information of the human image in a to-be-processed image and detecting human key points in the to-be-processed image; and obtain the second feature information and the first key point of each human object in the second image by performing the second image detection on the second image using the multi-task model.

As an example, the multi-task model may include a human body detection module, a key point detection module and a feature extraction module. Accordingly, the detection unit 62 may further configured to:

obtain a human body detection frame of each human object by detecting the human object in the second image using the human body detection module;

obtain the first key point of the human object by detecting the human key points within the human body detection frame using the key point detection module; and obtain the second feature information of the human object by extracting image feature information in the human body detection frame using the feature extraction module.

As an example, the first key point may include eye key points and shoulder key points. Accordingly, the detection unit 62 may further configured to:

determine, according to the eye key points and the shoulder key points, vertex positions of the head area; and determine, according to the vertex positions of the head area, the second detection frame of the head area.

As an example, the tracking unit 63 may further configured to:

calculate the first similarity between the first feature information and the second feature information;

calculate the second similarity between the first detection frame and the second detection frame;

calculate, according to the first similarity and the second similarity, a third similarity between each human object and the target human body in the second image; and recognize, according to the third similarity, the target human body from the human object in the second image.

As an example, the tracking unit 63 may further configured to:

after obtaining the second feature information of each human object in the second image and the second detection frame of the head area of the human object by performing the first image detection on the second image, obtain third feature information of the target human body in a third image and a third detection frame of a head area of the target human body in response to there being the third image, where the third image is a frame antecedent to the first image;

obtain fourth feature information by calculating average value of the first feature information and the third feature information;

obtain a fourth detection frame by calculating a middle position of the first detection frame and the third detection frame;

recognize, according to a third similarity between the fourth feature information and the second feature information, and a fourth similarity between the fourth detection frame and the second detection frame, the target human body from the human object in the second image.

It should be noted that the information interaction, execution process and other contents between the above-mentioned apparatus/units are based on the same concept as the method embodiment of the present disclosure, and their specific functions and technical effects can be specifically referred to the method embodiment part, which will not be described herein.

In addition, the object tracking apparatus 6 shown in FIG. 6 may be a software unit, a hardware unit, or a unit combining software and hardware that is built into an existing terminal device, or it may be integrated into the terminal device as an independent plug-in; otherwise, it may exist as an independent terminal device.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

Figure 7:
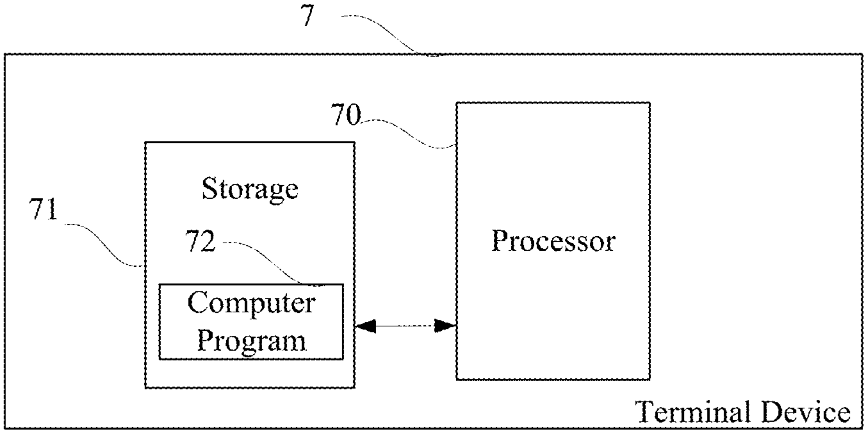
FIG. 7 is a schematic diagram of the structure of a terminal device according to an embodiment of the present disclosure.

FIG. 7 is a schematic diagram of the structure of a terminal device 7 according to an embodiment of the present disclosure. As shown in FIG. 7, in this embodiment, the terminal device 7 (e.g., a vehicle or a robot) may include at least one processor 70 (only one is shown in FIG. 7), a storage 71, and a computer program 72 stored in the storage 71 and can be executed on the at least one processor 70. When the processor 70 executes the computer program 72, the steps in each of the above-mentioned embodiments of the object tracking method are implemented.

The terminal device 7 may be a computing device such as a desktop computer, a notebook computer, a tablet computer, and a cloud server. The terminal device 7 may include, but is not limited to, the processor 70 and the storage 71. It can be understood by those skilled in the art that FIG. 7 is merely an example of the terminal device 7 and does not constitute a limitation on the terminal device 7, and may include more or fewer components than those shown in the figure, or a combination of some components or different components. For example, the terminal device 7 may further include an input/output device, a network access device, and the like.

The processor 70 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 71 may be an internal storage unit of the terminal device 7, for example, a hard drive or a memory of the terminal device 7. In other embodiments, the storage 71 may also be an external storage device of the terminal device 7, for example, a plug-in hard drive, a smart media card (SMC), a secure digital (SD) card, or a flash card that is equipped on the terminal device 7. Furthermore, the storage 71 may also include both the internal storage units and the external storage devices of the terminal device 7. The storage 71 may be configured to store operating systems, applications, boot loaders, data, and other programs such as codes of computer programs. The storage 71 may also be configured to temporarily store data that has been output or will be output.

The present disclosure further provides a computer-readable storage medium. The computer-readable storage medium is stored with a computer program. When the computer program is executed by a processor, the steps in each of the above-mentioned method embodiments can be implemented.

The present disclosure further provides a computer program product. When the computer program product is executed on the terminal device, the terminal device can implement the steps in the above-mentioned method embodiments.

When the integrated unit is implemented in the form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include at least any entity or device, a recording medium, a computer memory, a read-only memory (ROM), a random access memory (RAM), electric carrier signals, telecommunication signals and software distribution media that is capable of carrying the computer program codes on an apparatus/the terminal device, for example, a USB flash drive, a portable hard disk, a magnetic disk, an optical disk, or the like. In some jurisdictions, according to the legislation and patent practice, a computer readable medium cannot be electric carrier signals and telecommunication signals.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative modules and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device), terminal device and method may be implemented in other manners. For example, the above-mentioned apparatus/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The modules described as separate components may or may not be physically separated. The components represented as modules may or may not be physical modules, that is, may be located in one place or be distributed to multiple network modules. Some or all of the modules may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A method for tracking a target human body, comprising:

obtaining first feature information of the target human body in a first image and a first detection frame of a head area of the target human body;

obtaining second feature information of each human object in a second image and a second detection frame of a head area of the human object by performing a first image detection on the second image, wherein the second image is a frame after the first image; and recognizing the target human body from the human object in the second image according to a first similarity between the first feature information and the second feature information and a second similarity between the first detection frame and the second detection frame.

2. The method of claim 1, wherein obtaining the second feature information of each human object in the second image and the second detection frame of the head area of the human object by performing the first image detection on the second image comprises:

obtaining the second feature information and a first key point of each human object in the second image by performing a second image detection on the second image; and obtaining, according to the first key point, the second detection frame of the head area of the human object.

3. The method of claim 2, wherein obtaining the second feature information and the first key point of each human object in the second image by performing the second image detection on the second image comprises:

obtaining a trained multi-task model, wherein the multi-task model is for extracting feature information of the human image in a to-be-processed image and detecting human key points in the to-be-processed image; and obtaining the second feature information and the first key point of each human object in the second image by performing the second image detection on the second image using the multi-task model.

4. The method of claim 3, wherein the multi-task model includes a human body detection module, a key point detection module and a feature extraction module; and obtaining the second feature information and the first key point of each human object in the second image by performing the second image detection on the second image using the multi-task model comprises:

obtaining a human body detection frame of each human object by detecting the human object in the second image using the human body detection module;

obtaining the first key point of the human object by detecting the human key points within the human body detection frame using the key point detection module; and obtaining the second feature information of the human object by extracting image feature information in the human body detection frame using the feature extraction module.

5. The method of claim 2, wherein the first key point includes eye key points and shoulder key points; and obtaining, according to the first key point, the second detection frame of the head area of the human object comprises:

determining, according to the eye key points and the shoulder key points, vertex positions of the head area; and determining, according to the vertex positions of the head area, the second detection frame of the head area.

6. The method of claim 1, wherein recognizing the target human body from the human object in the second image according to the first similarity between the first feature information and the second feature information and the second similarity between the first detection frame and the second detection frame comprises:

calculating the first similarity between the first feature information and the second feature information;

calculating the second similarity between the first detection frame and the second detection frame;

calculating, according to the first similarity and the second similarity, a third similarity between each human object and the target human body in the second image; and recognizing, according to the third similarity, the target human body from the human object in the second image.

7. The method of claim 1, wherein after obtaining the second feature information of each human object in the second image and the second detection frame of the head area of the human object by performing the first image detection on the second image, the method further comprises:

obtaining third feature information of the target human body in a third image and a third detection frame of a head area of the target human body in response to there being the third image, wherein the third image is a frame antecedent to the first image;

obtaining fourth feature information by calculating average value of the first feature information and the third feature information;

obtaining a fourth detection frame by calculating a middle position of the first detection frame and the third detection frame;

recognizing, according to a third similarity between the fourth feature information and the second feature information, and a fourth similarity between the fourth detection frame and the second detection frame, the target human body from the human object in the second image.

8. A terminal device, comprising:

a camera;

a processor;

a memory coupled to the processor; and one or more computer programs stored in the memory and executable on the processor;

wherein, the one or more computer programs comprise:

instructions for obtaining first feature information of a target human body in a first image captured by the camera and a first detection frame of a head area of the target human body;

instructions for obtaining second feature information of each human object in a second image captured by the camera and a second detection frame of a head area of the human object by performing a first image detection on the second image, wherein the second image is a frame after the first image; and instructions for recognizing the target human body from the human object in the second image according to a first similarity between the first feature information and the second feature information and a second similarity between the first detection frame and the second detection frame.

9. The terminal device of claim 8, wherein the instructions for obtaining the second feature information of each human object in the second image and the second detection frame of the head area of the human object by performing the first image detection on the second image comprise:

instructions for obtaining the second feature information and a first key point of each human object in the second image by performing a second image detection on the second image; and instructions for obtaining, according to the first key point, the second detection frame of the head area of the human object.

10. The terminal device of claim 9, wherein the instructions for obtaining the second feature information and the first key point of each human object in the second image by performing the second image detection on the second image comprise:

instructions for obtaining a trained multi-task model, wherein the multi-task model is for extracting feature information of the human image in a to-be-processed image and detecting human key points in the to-be-processed image; and instructions for obtaining the second feature information and the first key point of each human object in the second image by performing the second image detection on the second image using the multi-task model.

11. The terminal device of claim 10, wherein the multi-task model includes a human body detection module, a key point detection module and a feature extraction module; and the instructions for obtaining the second feature information and the first key point of each human object in the second image by performing the second image detection on the second image using the multi-task model comprise:

instructions for obtaining a human body detection frame of each human object by detecting the human object in the second image using the human body detection module;

instructions for obtaining the first key point of the human object by detecting the human key points within the human body detection frame using the key point detection module; and instructions for obtaining the second feature information of the human object by extracting image feature information in the human body detection frame using the feature extraction module.

12. The terminal device of claim 9, wherein the first key point includes eye key points and shoulder key points; and the instructions for obtaining, according to the first key point, the second detection frame of the head area of the human object comprises:

instructions for determining, according to the eye key points and the shoulder key points, vertex positions of the head area; and instructions for determining, according to the vertex positions of the head area, the second detection frame of the head area.

13. The terminal device of claim 8, wherein the instructions for recognizing the target human body from the human object in the second image according to the first similarity between the first feature information and the second feature information and the second similarity between the first detection frame and the second detection frame comprise:

instructions for calculating the first similarity between the first feature information and the second feature information;

instructions for calculating the second similarity between the first detection frame and the second detection frame;

instructions for calculating, according to the first similarity and the second similarity, a third similarity between each human object and the target human body in the second image; and instructions for recognizing, according to the third similarity, the target human body from the human object in the second image.

14. The terminal device of claim 8, wherein the one or more computer programs further comprise:

instructions for obtaining third feature information of the target human body in a third image and a third detection frame of a head area of the target human body in response to there being the third image, wherein the third image is a frame antecedent to the first image;

instructions for obtaining fourth feature information by calculating average value of the first feature information and the third feature information;

instructions for obtaining a fourth detection frame by calculating a middle position of the first detection frame and the third detection frame;

instructions for recognizing, according to a third similarity between the fourth feature information and the second feature information, and a fourth similarity between the fourth detection frame and the second detection frame, the target human body from the human object in the second image.

15. A non-transitory computer-readable storage medium for storing one or more computer programs, wherein the one or more computer programs comprise:

instructions for obtaining first feature information of a target human body in a first image captured by the camera and a first detection frame of a head area of the target human body;

instructions for obtaining second feature information of each human object in a second image captured by the camera and a second detection frame of a head area of the human object by performing a first image detection on the second image, wherein the second image is a frame after the first image; and instructions for recognizing the target human body from the human object in the second image according to a first similarity between the first feature information and the second feature information and a second similarity between the first detection frame and the second detection frame.

16. The storage medium of claim 15, wherein the instructions for obtaining the second feature information of each human object in the second image and the second detection frame of the head area of the human object by performing the first image detection on the second image comprise:

instructions for obtaining the second feature information and a first key point of each human object in the second image by performing a second image detection on the second image; and instructions for obtaining, according to the first key point, the second detection frame of the head area of the human object.

17. The storage medium of claim 16, wherein the obtaining the second feature information and the first key point of each human object in the second image by performing the second image detection on the second image comprise:

instructions for obtaining a trained multi-task model, wherein the multi-task model is for extracting feature information of the human image in a to-be-processed image and detecting human key points in the to-be-processed image; and instructions for obtaining the second feature information and the first key point of each human object in the second image by performing the second image detection on the second image using the multi-task model.

18. The storage medium of claim 17, wherein the multi-task model includes a human body detection module, a key point detection module and a feature extraction module; and the instructions for obtaining the second feature information and the first key point of each human object in the second image by performing the second image detection on the second image using the multi-task model comprise:

instructions for obtaining a human body detection frame of each human object by detecting the human object in the second image using the human body detection module;

instructions for obtaining the first key point of the human object by detecting the human key points within the human body detection frame using the key point detection module; and obtaining the second feature information of the human object by extracting image feature information in the human body detection frame using the feature extraction module.

19. The storage medium of claim 16, wherein the first key point includes eye key points and shoulder key points; and the instructions for obtaining, according to the first key point, the second detection frame of the head area of the human object comprise:

instructions for determining, according to the eye key points and the shoulder key points, vertex positions of the head area; and instructions for determining, according to the vertex positions of the head area, the second detection frame of the head area.

20. The storage medium of claim 15, wherein the instructions for recognizing the target human body from the human object in the second image according to the first similarity between the first feature information and the second feature information and the second similarity between the first detection frame and the second detection frame comprise:

instructions for calculating the first similarity between the first feature information and the second feature information;

instructions for calculating the second similarity between the first detection frame and the second detection frame;

instructions for calculating, according to the first similarity and the second similarity, a third similarity between each human object and the target human body in the second image; and instructions for recognizing, according to the third similarity, the target human body from the human object in the second image.

* * * * *